United States Patent
Lereya et al.

(10) Patent No.: US 11,809,816 B2
(45) Date of Patent: Nov. 7, 2023

(54) SYSTEM AND METHOD FOR ELECTRONIC TABLE DISPLAY

(71) Applicant: Monday.com Ltd., Tel Aviv (IL)

(72) Inventors: Daniel Lereya, Tel Aviv (IL); Ariel Pollack, Tel Aviv (IL); Shani Frenkel, Jerusalem (IL)

(73) Assignee: monday.com Ltd., Tel Aviv (IL)

( * ) Notice: Subject to any disclaimer, the term of this patent is extended or adjusted under 35 U.S.C. 154(b) by 0 days.

(21) Appl. No.: 15/931,129

(22) Filed: May 13, 2020

(65) Prior Publication Data

US 2020/0364399 A1 Nov. 19, 2020

Related U.S. Application Data

(60) Provisional application No. 62/847,589, filed on May 14, 2019.

(51) Int. Cl.
*G06F 40/177* (2020.01)
*G06F 3/0488* (2022.01)
*G06F 40/103* (2020.01)

(52) U.S. Cl.
CPC .......... *G06F 40/177* (2020.01); *G06F 3/0488* (2013.01); *G06F 40/103* (2020.01)

(58) Field of Classification Search
CPC .. G06F 40/177; G06F 3/0488; G06F 3/04845; G06F 3/04883
See application file for complete search history.

(56) References Cited

U.S. PATENT DOCUMENTS

| 7,469,381 | B2 | 12/2008 | Ording | |
|---|---|---|---|---|
| 10,614,616 | B1 * | 4/2020 | Tedesco | G06F 3/017 |
| 2008/0028290 | A1 * | 1/2008 | Suwiryo | G06F 40/177 |
| | | | | 715/227 |
| 2012/0185761 | A1 * | 7/2012 | Adepalli | G06F 3/04883 |
| | | | | 715/227 |
| 2014/0365968 | A1 * | 12/2014 | Beaver | G06F 3/04883 |
| | | | | 715/830 |
| 2018/0367840 | A1 * | 12/2018 | Kleinerman | H04N 21/47 |

OTHER PUBLICATIONS

Arjuna Nawarathne, Disable Excel 2016 (365) Elastic Scroll_Rubber Banding, Microsoft Community, Apr. 16, 2019, 4 pages (Year: 2019).*
Robert Paris, excel 2016 horizontal scrolling—Apple Community, May 25, 2017, 2 pages (Year: 2017).*

* cited by examiner

*Primary Examiner* — Scott T Baderman
*Assistant Examiner* — Seung Woon Jung

(57) ABSTRACT

A method for enabling selective field expansion in an electronically displayed table is provided. The method includes rendering at least a portion of the electronic table on a display, the electronic table including a plurality of cells, each cell associated with a unique row and column combination, wherein the rendered portion of the electronic table includes a plurality of cells including at least one edge cell containing information; receiving a user input indicating a direction away from the edge cell; in response to the user input, rendering the edge cell with a width wider than a default width to thereby display more information in the wider width than was displayed in the default width; and upon termination of the user input, rendering the edge cell with the default width.

8 Claims, 8 Drawing Sheets

SYSTEM AND METHOD FOR ELECTRONIC TABLE DISPLAY

CROSS-REFERENCE TO RELATED APPLICATIONS

This application claims the benefit of U.S. Provisional Application No. 62/847,589 filed on May 14, 2019, the contents of which are hereby incorporated by reference.

TECHNICAL FIELD

The disclosure generally relates to electronic document display and particularly to displaying electronic table documents.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

Electronic screens are omnipresent and with them a desire to display more and more information to users. However, different display sizes, resolutions, and the ability of the human eye to discern data (i.e., numerals and characters) and pictures (e.g. pixel size) vary widely among such devices.

It is therefore advantageous to provide solutions which can render at least data and information in a manner which is pleasing to human eyes and understandable as well.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a non-transitory computer readable medium containing instructions for enabling selective field expansion in an electronically displayed table, the instructions being configured to cause at least one processor to execute operations, comprising: rendering at least a portion of the electronic table on a display, the electronic table including a plurality of cells, each cell associated with a unique row and column combination, wherein the rendered portion of the electronic table includes a plurality of cells including at least one edge cell containing information; receiving a user input indicating a direction away from the edge cell; in response to the user input, rendering the edge cell with a width wider than a default width to thereby display more information in the wider width than was displayed in the default width; and upon termination of the user input, rendering the edge cell with the default width.

Certain embodiments disclosed herein also include a non-transitory computer readable medium containing instructions for enabling selective field expansion in an electronically displayed table, the instructions being configured to cause at least one processor to execute operations, comprising: rendering at least a portion of the electronic table on a display, the electronic table including a plurality of cells, each cell associated with a unique row and column combination, wherein the rendered portion of the electronic table includes a plurality of cells including at least one edge cell containing information; receiving a user input indicating a direction away from the edge cell; in response to the user input, rendering the edge cell with a width wider than a default width to thereby display more information in the wider width than was displayed in the default width; and upon termination of the user input, rendering the edge cell with the default width.

Certain embodiments disclosed herein also include a method for enabling selective field expansion in an electronically displayed table. The method comprises rendering at least a portion of the electronic table on a display, the electronic table including a plurality of cells, each cell associated with a unique row and column combination, wherein the rendered portion of the electronic table includes a plurality of cells including at least one edge cell containing information; receiving a user input indicating a direction away from the edge cell; in response to the user input, rendering the edge cell with a width wider than a default width to thereby display more information in the wider width than was displayed in the default width; and upon termination of the user input, rendering the edge cell with the default width.

Certain embodiments disclosed herein also include a system for enabling selective field expansion in an electronically displayed table. The system comprises a processor; and a memory, the memory containing instructions that, when executed by the processing circuitry, configure the system to: render at least a portion of the electronic table on a display, the electronic table including a plurality of cells, each cell associated with a unique row and column combination, wherein the rendered portion of the electronic table includes a plurality of cells including at least one edge cell containing information; receive a user input indicating a direction away from the edge cell; in response to the user input, render the edge cell with a width wider than a default width to thereby display more information in the wider width than was displayed in the default width; and upon termination of the user input, render the edge cell with the default width.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claims. Moreover, some statements may apply to some inventive features but not to others. In general, unless otherwise indicated, singular elements may be in plural and vice versa with no loss of generality.

By way of example to the disclosed embodiments, techniques for rendering of an electronic table on a digital display in way that the edge rows and edge columns in a manner which would increase the visual appeal of the displaying application are disclosed. A portion of an electronic table is rendered so that at least one cell is an edge cell. A user input is received indicating a direction away from the edge cell. The edge cell is then rendered with a width wider than the default width, until the input terminates, at which point the edge cell is rendered back to the default width, so that the edge cell appears to continuously contract in width. In another embodiment, the edge cell is continuously rendered from the default width to the wider width, so that the edge cell appears to continuously expand in width.

Figure 1:
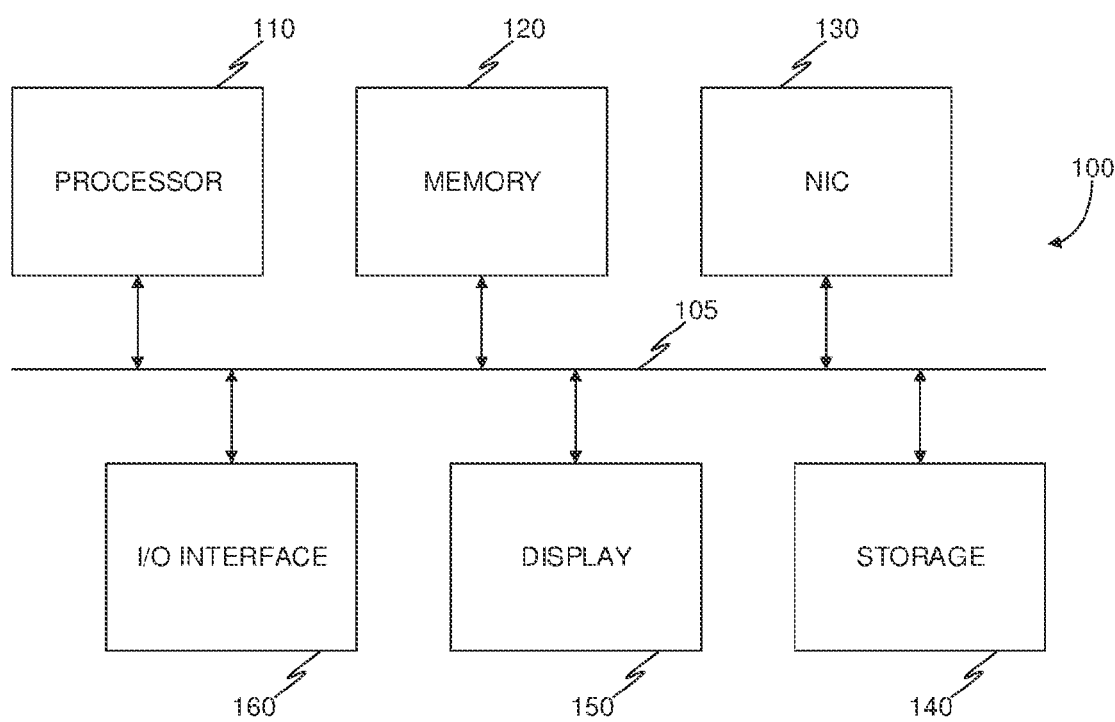
FIG. 1 is a schematic illustration of a computing device operative for displaying electronic documents, implemented according to an embodiment.

FIG. 1 is an example schematic illustration of a computing device 100 operative for displaying electronic documents, implemented according to an embodiment. The device 100 includes at least one processor 110, for example, a central processing unit (CPU). In an embodiment, the processor 110 may be, or be a component of, a larger processing unit implemented with one or more processors. The one or more processors may be implemented with any combination of general-purpose microprocessors, microcontrollers, reduced instruction set computer (RISC), digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processor 110 is coupled via a bus 105 to a memory 120. The memory 120 may include a memory portion 122 that contains instructions that when executed by the processor 110 performs the method described in more detail herein. The memory 120 may be further used as a working scratch pad for the processor 110, a temporary storage, and others, as the case may be. The memory 120 may be a volatile memory such as, but not limited to random access memory (RAM), or non-volatile memory (NVM), such as, but not limited to, Flash memory. The processor 110 may be coupled to network interface controller (NIC) 130.

The NIC 130 provides connectivity to the device 100, allowing for example to connect to other devices over a network. In an embodiment, the NIC 130 is configured to connect to a network that may be configured to provide connectivity of various sorts, as may be necessary, including but not limited to, wired and/or wireless connectivity, including, for example, local area network (LAN), wide area network (WAN), metro area network (MAN), worldwide web (WWW), Internet, and any combination thereof, as well as cellular connectivity.

The processor 110 may be further coupled with a persistent storage 140. Storage 140 may be used for the purpose of holding a copy of the method executed in accordance with the disclosed technique. The storage 140 may also be used as a cache for various programs, applications, or other software executed by the processor. Such a cache may be, for example, a web cache used by an internet browser application. The processor 110 may be coupled with a display 150. The display 150 is operative for displaying user interfaces, electronic documents, web pages, and the like. The processor 110 may be further coupled with an I/O interface 160. The I/O interface 160 may provide connectivity to various I/O devices such as touch based input devices (e.g. touchscreen), keyboards, mice, touchpads, biometric scanners, photo detectors, cameras, microphones, speakers, and the like.

The processor 110 and/or the memory 120 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described in further detail herein.

Figure 2A:
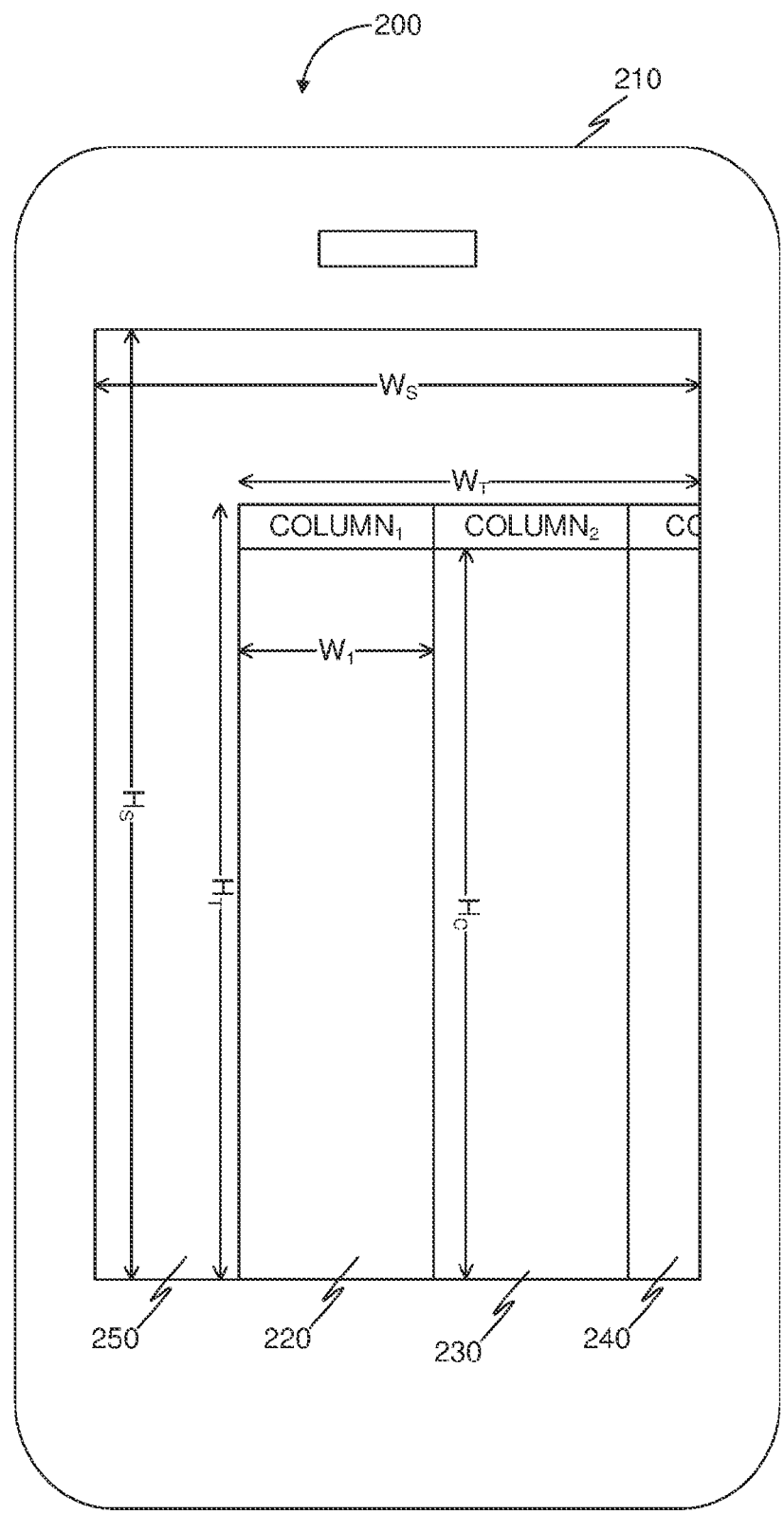
FIG. 2A is a schematic illustration of a mobile computer device operative for displaying electronic documents, implemented according to an embodiment.

FIG. 2A is a schematic illustration of a mobile computer device 200 operative for displaying electronic documents, implemented according to an embodiment. The computing device includes a casing 210 to hold therein various components, such as those of FIG. 1. Additionally, the casing 210 may hold a power source (not shown), such as a battery, to power the mobile computer device 200. The mobile computer device 200 may be, for example, a smartphone, tablet, laptop, and the like. The device 200 is equipped with a display 250. The display 250 screen has a width (WS) and a height (HS).

In an embodiment, the screen height and width can be expressed as a matrix of pixels, or as a diagonal length based on the height and width. In this embodiment, a portion of the screen is devoted to displaying an electronic document. The screen portion has a width ($W_T$) which is smaller than the screen width ($W_S$), and a height ($H_T$) which is smaller than the height of the screen ($H_S$).

According to an embodiment, the electronic document is a table, which when displayed in a resolution legible to human eyes would be larger than the portion of the screen which has been devoted to it. An application for displaying electronic documents may determine how much screen area should be devoted to displaying the electronic document, and what portion of the screen area should be devoted to displaying other objects.

In the example illustrated in FIG. 2, the application has devoted the screen portion with width ($W_T$) and height ($H_T$) to the display of the electronic document. The electronic document includes a table, which is comprised of a plurality of columns, such as a first column 220, a second column 230, and a third column 240. The third column 240 is partially displayed and partially cut off, which a user of the device 200 would interpret as there being more to view of the table. This would result in the user attempting, for example, to gesture a scroll, or use arrow keys to attempt to change the display of the table to view additional information.

To accomplish this a motion or key would be required to indicate a movement in the direction from right (closest to column 240) to left (closest to column 220). Alternatively, the user may gesture a bottom to up motion (or appropriate key) to show additional rows of the table. In an embodiment, the content (i.e. rows) of the table may alternate display, while the column header (e.g. Column1) remains static. In some embodiments, one or more rows and/or columns may be set to a static mode, so that the static rows and/or columns are constantly at least partially displayed, and the remainder of the display portion is dedicated to rendering dynamic views of the electronic document, which are rendered in response to user inputs (e.g. recognizing touch gestures in a certain direction).

In certain embodiments static rows and/or columns may be predetermined by the application, or manually by a user. In yet other embodiments, the application may determine that the display portion is too small to enable static columns and/or rows, and disable such a rendering feature, such that a user of the device cannot manually designate a static row and/or column.

Figure 2B:
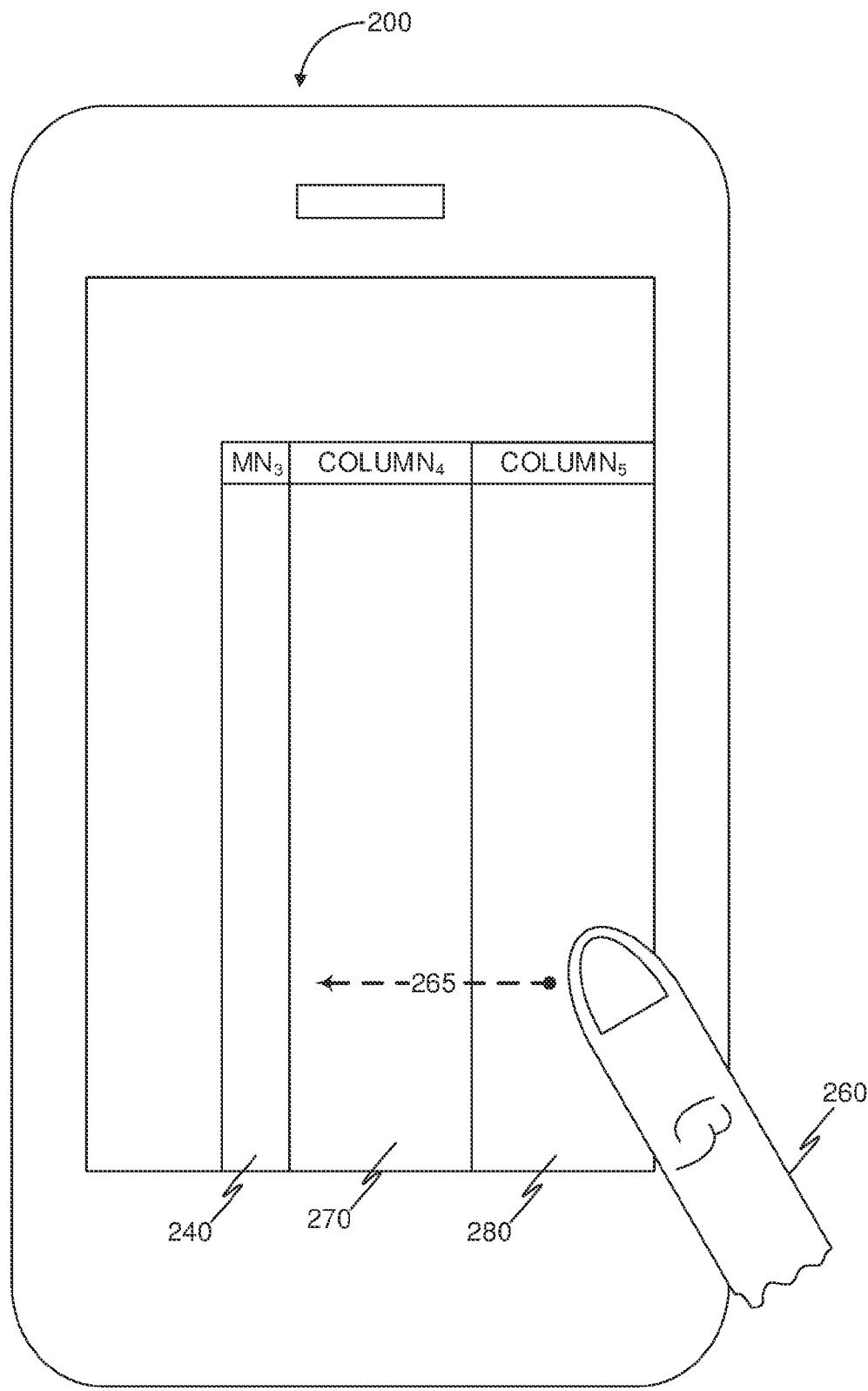
FIG. 2B is a schematic illustration of a mobile computer device operative for displaying electronic documents, implemented in accordance with another embodiment.

FIG. 2B is a schematic illustration of a mobile computer device 200 operative for displaying electronic documents, implemented in accordance with another embodiment. In this embodiment, the screen 250 includes a touch-based interface, with which a human appendage, such as finger 260 may interact. The finger 260 performs a swipe motion 265 from right to left. As a result of that the processor (not shown) of the device 200 renders a new view of the electronic table. In this new view third column 240 is partially visible, such that a portion of the column which was visible before is no longer visible (i.e., rendered) and a portion of the column which was not visible is now visible. Further, fourth column 270 and fifth column 290 are now fully visible. By performing such motions, more areas of the electronic table may be viewed, by rendering a different display in response to the user inputs.

Figure 2C:
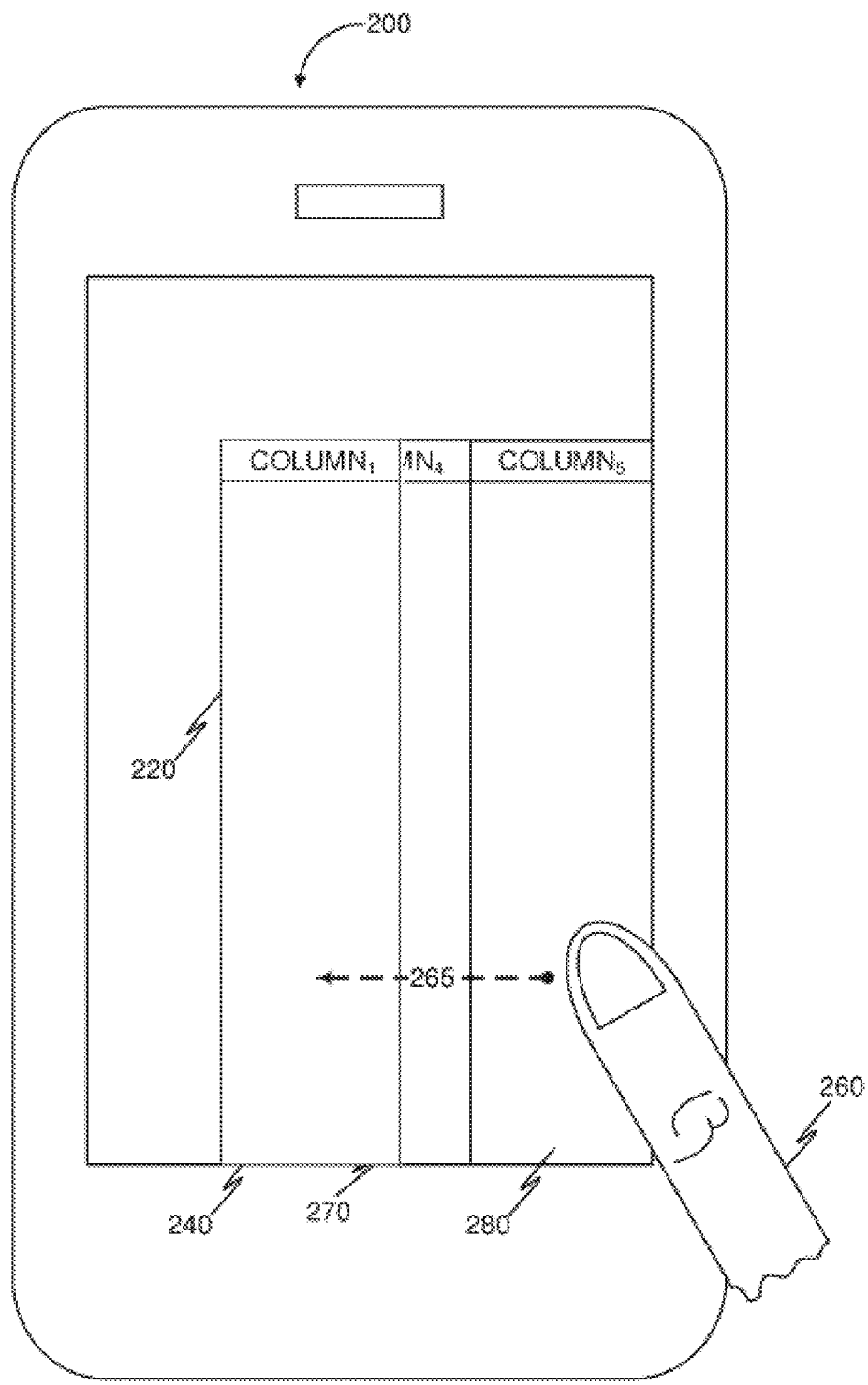
FIG. 2C is a schematic illustration of a mobile computer device operative for displaying electronic documents in another mode, implemented in accordance with an embodiment.

FIG. 2C is a schematic illustration of a mobile computer device 200 operative for displaying electronic documents in another mode, implemented in accordance with an embodiment. As noted above, in some embodiments the application may designate one or more rows and/or columns to be static. For simplicity, the disclosure, as discussed herein, provides an example of a single column, though this is intended in no way to be any limitation, and it is readily apparent that one or more columns, and or one or more rows, may be rendered as static, without departing from the scope of this disclosure. In some such embodiments, it may be further useful to distinguish the static column from the other columns.

In this example, the application has set first column 220 to be a static column. The first column is rendered here as a partially transparent overlay over the rest of the table (i.e. columns) so that the rendered portion of third column 240 is partially visible under the overlay, and fourth column 270 is rendered so that a portion of the column is partially visible under the overlay, and another portion is fully visible, since it is not under the overlay. In some embodiments, the width of a static column may change in response to the gesture 265, such that the width of the static column is rendered from a default width (i.e. width W1 as shown in FIG. 2A) to a static column minimum width, which is smaller than the default width. In such embodiments the column width may be rendered dynamically as the gesture is occurring, to seem responsive to the gesture.

Figure 2D:
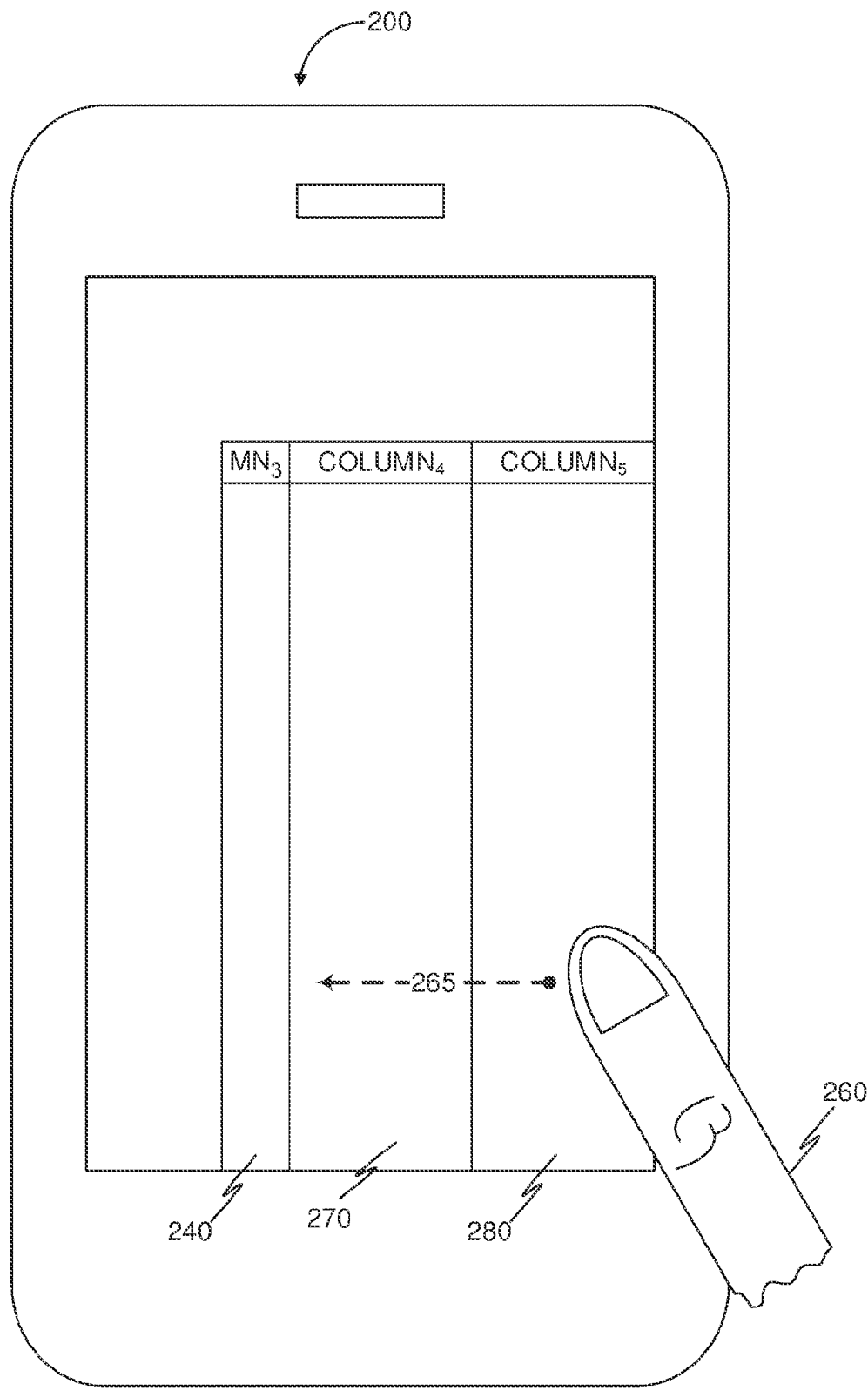
FIG. 2D is a schematic illustration of a mobile computer device operative for displaying electronic documents in yet another mode, implemented in accordance with an embodiment.

FIG. 2D is a schematic illustration of a mobile computer device 200 operative for displaying electronic documents in yet another mode, implemented in accordance with an embodiment. In this example, the application has again set first column 220 to be a static column. The first column is rendered here as an underlay under the rest of the table (i.e. columns), so that the rendered portion of third column 240 is fully visible over the underlay, and fourth column 270 is likewise rendered fully visible over the underlay. The rendered portion of third column 240 and fourth column 270 may be partially transparent, so that the first column 220 is at least partially visible thereunder. In some embodiments the amount of transparency may be determined based on any of: the color of the column, the color of the column lines (borders), color of text, ambient light, display brightness, user preference as manually input, and the like.

Figure 3A:
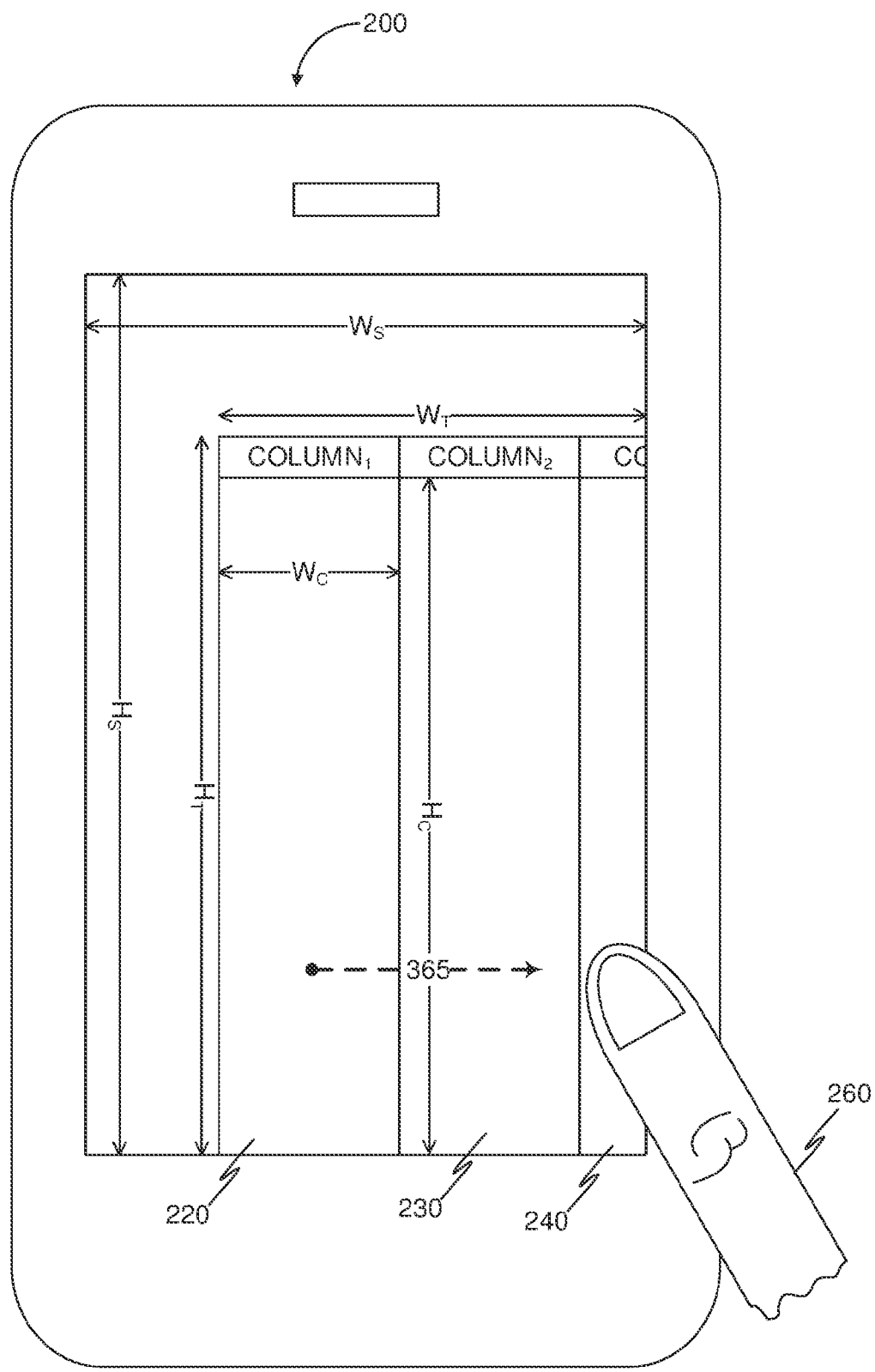
FIG. 3A is a is a schematic illustration of a mobile computer device operative for displaying electronic documents, implemented in accordance with yet another embodiment.
Figure 3B:
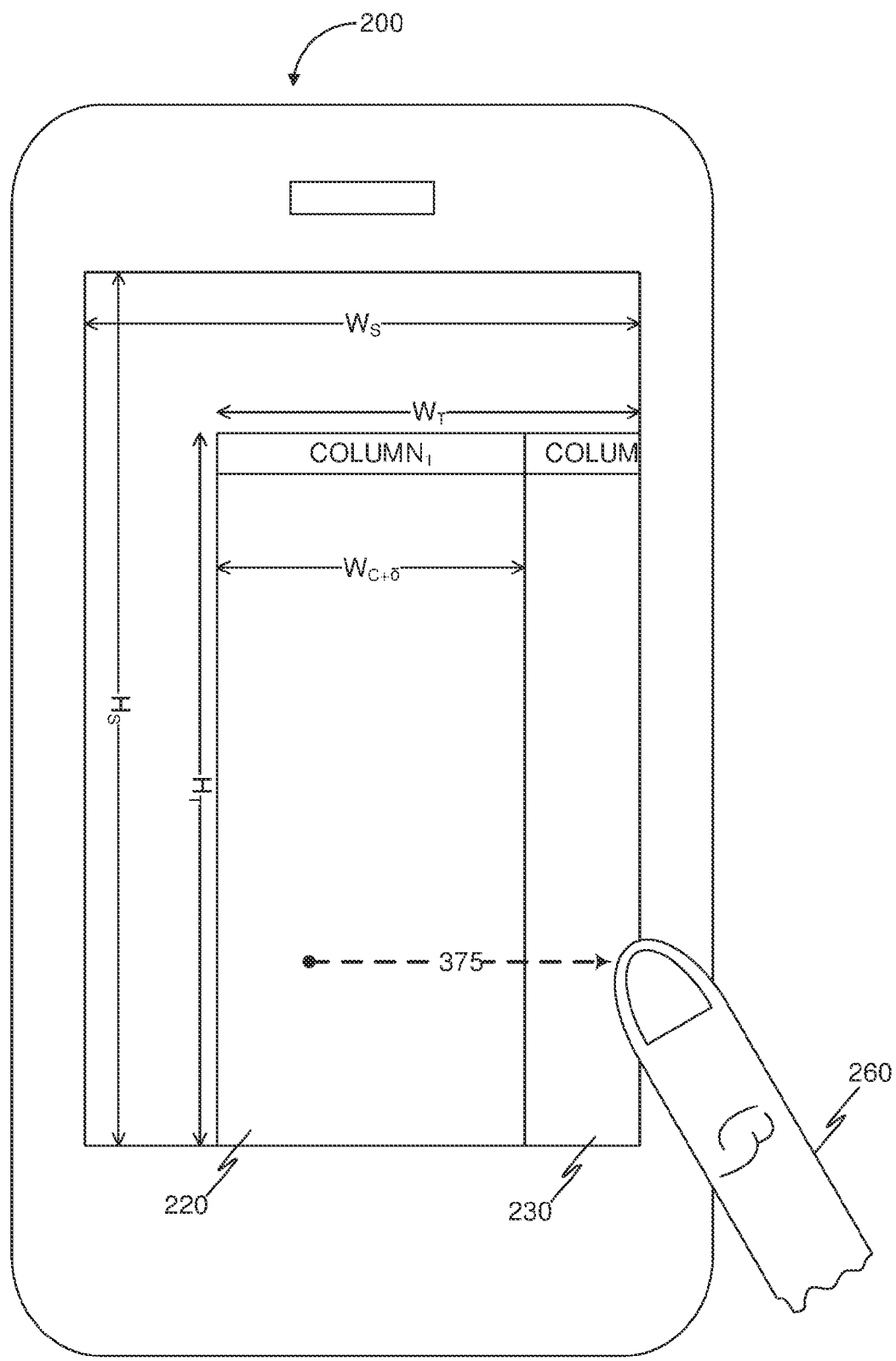
FIG. 3B is schematic illustration of a mobile computer device displaying an electronic table with a rendered view responsive to a user input, implemented in accordance with an embodiment.

FIG. 3A is an schematic illustration of a mobile computer device 200 operative for displaying electronic documents, implemented in accordance with yet another embodiment, while FIG. 3B is a schematic illustration of a mobile computer device 200 displaying an electronic table with a rendered view responsive to a user input, implemented in accordance with an embodiment. In the embodiment of FIG. 3A columns 220 and 230 are fully visible, while column 240 is partially visible.

As shown in FIG. 2B above, a right to left gesture input on the touchscreen would result in rendering a display of additional portions of the electronic table, which are currently obscured or not shown at all. In this embodiment, the finger 260 performs a swipe motion 365 from left to right, i.e., from the direction of column 220 towards column 230.

The application may attempt to determine if there are additional columns which are left of column 220, however, in this case there are none. Therefore, the disclosure suggests that the application render a view of the table with the edge column, in this example left-most column 220, rendered wider than other columns. In an embodiment, as the motion of the finger 260 continues to the right, the application may render the column 220 wider and wider, rendering less and less of the other column(s). Column 220 has a width WC, which in some embodiments may be a default width given to all columns. In other embodiments the width of any column may be determined by the electronic document application based on, for example, the content of the column, the maximum or minimum character length of data in any one column, and the like.

In FIG. 3B the application has rendered the display of the electronic table so that column 220 is rendered as wider than in FIG. 3A. Specifically, the width of column 220 in FIG. 3A was $W_C$, while the width of the re-rendered column 220 of FIG. 3B is now $W_C+\delta$, where 'δ' denotes a value which is larger than zero. The value for 'δ' may increase in response to the input generated by the user. In this example, the gesture motion 365 is shorter than the gesture motion 375.

For the purposes of this example, a gesture may be considered longer than another based on a line measured between a point where the gesture was first recorded as beginning, to a point where the gesture was recorded as terminating. It should be apparent that such a measurement need not necessarily occur, and that this is simply one way of determining the length of an input. In some embodiments, in response to detecting that the gesture has ended (i.e. no further touch input is received in connection to this gesture) the application may cause the electronic document to render back to a previous view, where the column 220 has a width of $W_C$. In such an embodiment, the render may include an animation, for example to denote that the width of the column 220 is elastic, by bouncing back and forth between a first and second width, and settling on a final width, such as $W_C$.

Figure 4:
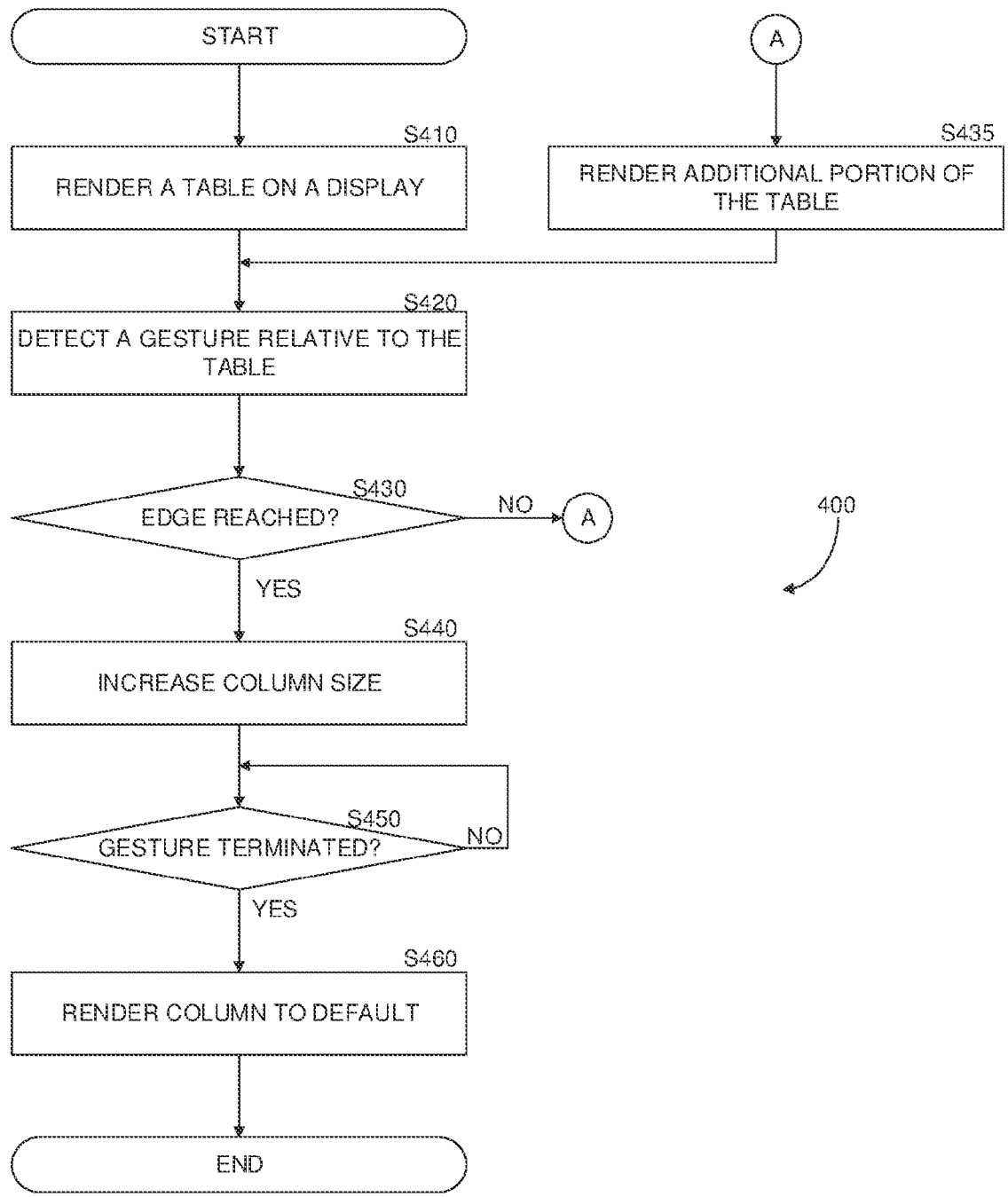
FIG. 4 is a flowchart of a method for displaying an electronic document table on a computing device, implemented in accordance with an embodiment.

FIG. 4 is an example flowchart 400 of a method for enabling selective field expansion in an electronic document table on a computing device, implemented in accordance with an embodiment.

At S410 an electronic document table is rendered on a screen display of a computing device, such as computing device 100 of FIG. 1. The display is connected to an input, such as a touch input, which is operative for receiving user inputs that indicate or correspond to a direction relative to the display. For example, a touch-based input (i.e. touch-screen or touchpad) can receive gestures, such as a continuous touch of a finger across the surface of the display or pad, which may be characterized by a start point and an end point. At S420, a gesture is detected by the touch-based input. In an embodiment, actual touch need not necessarily occur, it may be possible to sense a gesture, for example, by optic sensors. A gesture may be any input linked to a movement in a particular direction, such as movement of a finger or other appendage across a touch based input surface, repeated key strokes or continuous holding of a keyboard key indicating a direction (such as arrow keys), detection of movement using an optic sensor or photo sensor, and the like.

The touch-based input may be a continuous user input for interacting, or otherwise changing electronic document tables. In an example embodiment, the user input (and a continuous user input), may include a voice command, a keystroke, and mouse click. For example, the continuous user input may be a binary-click once to expand, click again to contract a cell in the table. In an embodiment, the continuous user input (e.g., touch-based input) may include a cell selection followed by a continuous dragging of the selection to cause the selected cell to render as expanding in response to the continuous dragging.

At S430, a check is performed to determine if an edge of the electronic document was reached, based on the gesture. For a table an edge may be defined by the top row, bottom row, left-most column, right-most column, or any combination thereof. If 'NO', execution continues at S435, if 'YES' execution continues at S440.

At S435 an additional portion of the electronic table is rendered, in response to the direction of the gesture. It should be appreciated that where the display area for the electronic table is set at a constant width, height, or both, then a new portion of the table rendered would mean discarding another portion which was previously displayed. In some embodiments, in response to the direction of the gesture, one or more columns and/or rows of the table may be rendered with a different respective width or height.

At S440, in response to detecting that an edge of the table is reached because of the gesture, the column size of one or more columns closest to the edge is increased. In some embodiments, the amount of increase may be proportional to the length of the gesture, such as illustrated above with respect to FIGS. 3A and 3B. For example, if the edge is a left or right edge (i.e., an edge of only a single column), then the column closest to edge may be rendered as wider than a previous render. In an embodiment, the column may be rendered wider as a function of the gesture length.

In some embodiments, a plurality of columns may be rendered wider, such that the column closest to the edge is rendered widest, the column second closest to the edge is rendered wider, but less wide than the column closest to the edge, etc. In certain embodiments, the edge may be a top or bottom edge, and may affect one or more columns. In such embodiments, each column may be rendered as stretched in a direction opposite of the gesture. For example, if the gesture direction is 'up' rows which are below the currently displayed rows should be displayed. When the bottom-most row is reached, and an 'up' gesture (i.e. gesture from bottom to top) is detected then the bottom row may be rendered as taller. The rendering may include rendering a 'stretch' effect in some embodiments.

In yet other embodiments, one or more columns may be defined as static columns as detailed above. In such embodiments static columns may be rendered as a partially transparent overlay over the table, or rendered as an underlay under a partially transparent table.

At S450 a check is preformed to determine if the gesture has terminated. In some embodiments, a gesture may be determined to begin based on a first input, such as a keyboard input, detection of a touch at a first point in a touch input, or initial detection of motion by an optical sensor. A gesture may be determined to terminate, for example, if a continuous motion was made from the first point to a second point in the touch input, and then determining that the second point no longer senses a touch.

If the gesture has terminated execution continues at S460, otherwise a second check is performed at a later point in time. For example, if a gesture is detected as having begun at a first point and is currently at a second point, the gesture has not necessarily terminated if the user finger is still pressed against the touchscreen. The same may apply, for example, if a keyboard key is continuously pressed, and is only considered to terminate once the key is released.

At S460, the column(s) increased in size are rendered again back to the original size. In some embodiments, the original size may be a default size with which all columns are rendered, or a size based on attributes of the column data, such as length of text, length of text with or without spaces, and so on. In an embodiment, S460 includes causing the selected cell to contract upon cessation of at least one of the continuous dragging or the cell selection.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A non-transitory computer readable medium containing instructions for enabling displaying electronic document tables, the instructions being configured to cause at least one processor to execute operations, comprising:
    rendering a portion of an electronic table on a display, the rendered portion including at least a first edge column and/or at least a first edge row of the table, rendered at a default width and a second column adjacent the first edge column and/or a second row adjacent the first edge row, wherein the at least first edge column and/or first edge row are respectively a column or a row at an edge of said table;
    receiving a continuous user input indicating a movement direction starting from a first point on said display and stopping at a second point on said display, wherein said second point is closer to an edge of the rendered portion of said table than said first point;
    initially altering the first edge column or the first edge row in a manner rendering the first edge column or the first edge row at a reduced width less than the default width, in response to the received user input, wherein altering the first edge column or the first edge row is according to said movement direction; and
    in response to continued received user input, in said movement direction, identifying whether a display portion displaying said portion of said table is in a size capable to accommodate static columns or static rows;
    in response to identifying that said display portion displaying said portion of said table is in a size capable to accommodate static columns or static rows, designating said at least first edge column or said at least first edge row as static, and re-rendering the display to cause the first edge column or the first edge row and the second column or the second row to be rendered in an overlaying manner, wherein the overlaying manner is defined as rendering one of the first edge column and the second column, or the first edge row and the second row as an overlaying column or an overlaying row.

2. The computer readable medium of claim 1, wherein when said at least first edge column or said at least first edge row is designated as static, the first edge column or the first edge row is partially transparent, and is rendered on top of the second edge column or the second edge row.

3. The computer readable medium of claim 1, wherein when said at least first edge column or said at least first edge row is designated as static, the second edge column or the second edge row is partially transparent, and is rendered on top of the first edge column or the first edge row.

4. The computer readable medium of claim 1, wherein said at least first edge column of the table and/or said at least a first row of the table comprises two or more columns and/or two or more rows of the table.

5. The computer readable medium of claim 1, wherein said second column comprises a plurality of consecutive columns and/or said second row comprises a plurality of consecutive rows and wherein some of said plurality of consecutive columns and/or said plurality of consecutive rows are rendered in said overlaying manner and a remaining columns and/or rows of the plurality of columns and/or rows are not rendered in said overlaying manner.

6. The computer readable medium of claim 5, wherein a first portion of one column of said plurality of columns and/or a first part of one row of said plurality of rows is rendered in said overlaying manner and a remaining portion of said one column of said plurality of columns and/or a remaining part of said one row of said plurality of rows is not rendered in said overlaying manner.

7. The computer readable medium of claim 2, wherein an amount of transparency is determined based on at least one member of a group consisting of: a color of the column and/or a color of the row, a color of column border and/or a color of row border, a color of text, ambient light, display brightness and user preference as manually input.

8. The computer readable medium of claim 3, wherein an amount of transparency is determined based on at least one member of a group consisting of: a color of the column and/or a color of the row, a color of column border and/or a color of row border, a color of text, ambient light, display brightness and user preference as manually input.

* * * * *